(12) United States Patent
Salam et al.

(10) Patent No.: US 8,724,449 B2
(45) Date of Patent: May 13, 2014

(54) FAILURE PROTECTION FOR ACCESS RING TOPOLOGY

(75) Inventors: Samer Salam, Vancouver (CA); Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 540 days.

(21) Appl. No.: 12/456,100

(22) Filed: Jun. 10, 2009

(65) Prior Publication Data

US 2010/0315946 A1 Dec. 16, 2010

(51) Int. Cl.
*H04L 12/28* (2006.01)
*H04L 12/56* (2006.01)

(52) U.S. Cl.
CPC ..................... *H04L 45/28* (2013.01)
USPC ............................... 370/216; 714/2

(58) Field of Classification Search
CPC ................ H04L 45/22; H04L 45/28
USPC ................ 370/222, 216, 403; 714/2
See application file for complete search history.

(56) References Cited

U.S. PATENT DOCUMENTS

| | | | |
|---|---|---|---|
| 7,345,991 B1 * | 3/2008 | Shabtay et al. ............... | 370/221 |
| 2002/0196735 A1 * | 12/2002 | Hayes ........................... | 370/216 |
| 2009/0034413 A1 | 2/2009 | Sajassi et al. | |
| 2009/0274044 A1 * | 11/2009 | Goose et al. .................. | 370/225 |
| 2010/0165831 A1 * | 7/2010 | Elie-Dit-Cosaque et al. .............................. | 370/217 |
| 2010/0287405 A1 * | 11/2010 | Soon ................................. | 714/4 |

OTHER PUBLICATIONS

Internet Draft of Inter-Chassis Communication Protocol for L2VPN Redundancy, Internet Engineering Task Force (IETF), Martini, et al., Feb. 2, 2009.*
Ethernet Service OAM: Overview, Applications, Deployment, and Issues, Fujitsu Network Communications Inc., pp. 1-19, 2006.*
User Network Interface (UNI) Type 2 Implementation Agreement, Metro Ethernet Forum, Technical Specification MEF 20, pp. 1-23, Jul. 2008.*
Luca Martini et al., Inter-Chassis Communication Protocol for L2VPN PE Redundancy, Feb. 17, 2009, IETF http://tools.ietf.org/html/draft-martini-pwe3-iccp-01.

* cited by examiner

*Primary Examiner* — Huy D Vu
*Assistant Examiner* — Benjamin Lamont
(74) *Attorney, Agent, or Firm* — Cindy Kaplan

(57) ABSTRACT

In one embodiment, a method includes configuring a first node, located at an edge of a core network and connected to an access ring, with a maintenance end point for a virtual local area network on a port connecting the first node to the access ring. The first node operates in an active mode for the virtual local area network and is in communication with a second node located at the edge of the core network and connected to the access ring. The method further includes receiving and processing at a processor at the first node, continuity check messages from access nodes on the access ring, synchronizing the first node with the second node, and communicating from the first node to the second node to initiate switching of the second node from a backup mode to the active mode for the virtual local area network upon identification of a failure.

18 Claims, 5 Drawing Sheets

FAILURE PROTECTION FOR ACCESS RING TOPOLOGY

BACKGROUND OF THE INVENTION

The present disclosure relates generally to communication networks, and more particularly, to failure protection for an access ring topology.

Carrier Ethernet service providers often deploy access networks in a ring topology, which offers resiliency, fast recovery time, and cost savings since rings require fewer links as compared to mesh topologies. For bridged Ethernet networks deployed in rings, it is important to provide quick restoration following a link or node failure to prevent network outages, which may result in lost revenue and potential penalties mandated by contractual agreements with customers running mission critical applications.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises configuring a first node located at an edge of a core network and connected to an access ring to assign a maintenance end point for a virtual local area network on a port connecting the first node to the access ring. The first node operates in an active mode for the virtual local area network and is in communication with a second node located at the edge of the core network and connected to the access ring. The method further includes receiving and processing at a processor at the first node, continuity check messages from access nodes on the access ring, synchronizing the first node with the second node, and communicating from the first node to the second node to initiate switching of the second node from a backup mode to the active mode for the virtual local area network upon identification of a failure.

In another embodiment, an apparatus located at an edge of a core network and connected to an access ring generally comprises a processor for assigning a maintenance end point for a virtual local area network on a port connecting the apparatus to the access ring, communicating with an edge node located at the edge of the core network and connected to the access ring, processing continuity check messages received from access nodes on the access ring, synchronizing state with the edge node, and communicating to the edge node to initiate switching of the edge node from a backup mode to an active mode for the virtual local area network upon identification of a failure. The apparatus further includes memory for storing a state of the apparatus based on received continuity check messages.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, features relating to technical material that is known in the technical fields related to the invention have not been described in detail.

Embodiments described herein provide fault protection in an access ring topology. In one embodiment, a resiliency mechanism enables dual-homing of access rings to MPLS provider edge (PE) nodes. The embodiments provide protection against split ring failures, without compromising scalability, and while allowing load balancing of traffic in the network. The embodiments may be used with VPWS (Virtual Private Wire Service) and VPLS (Virtual Private Local Area Network (LAN) Service), for example.

Figure 1:
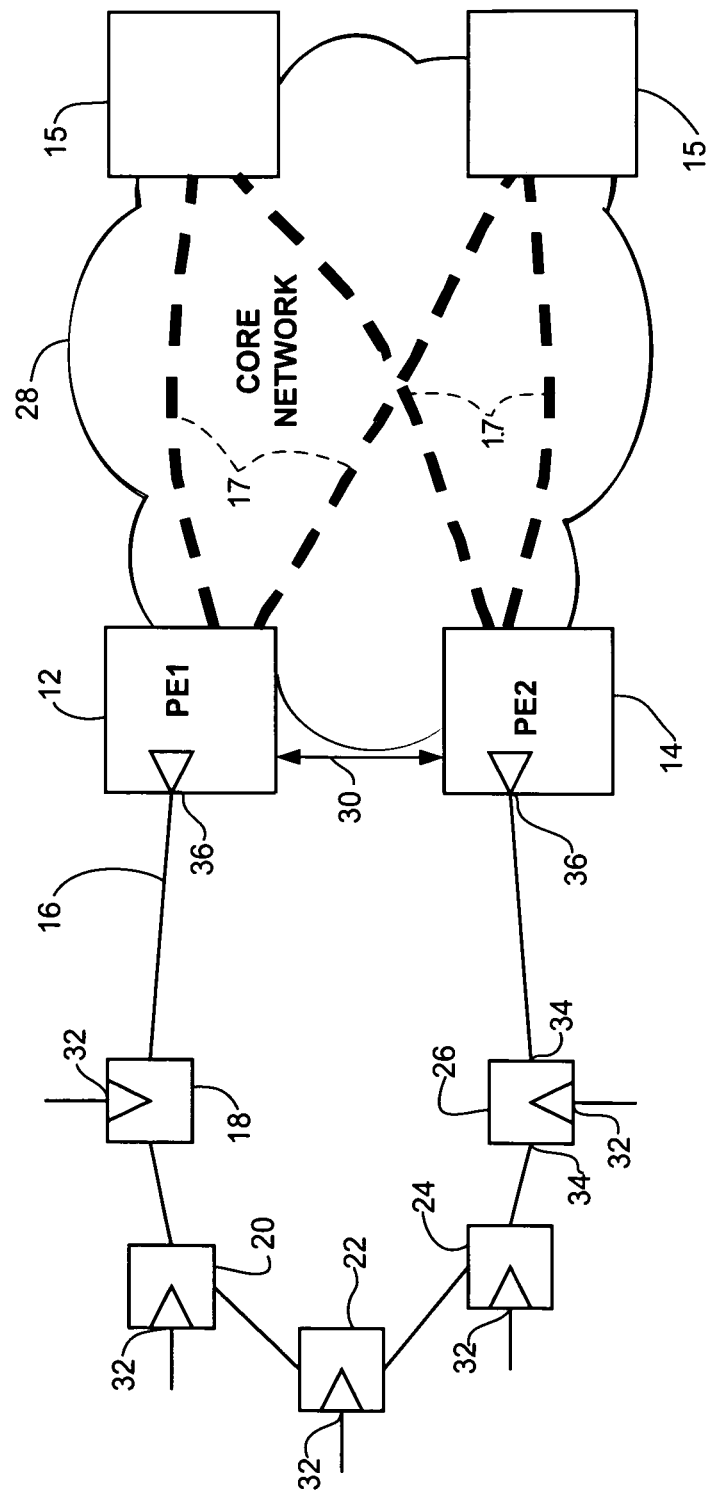
FIG. 1 illustrates an example of a network in which embodiments described herein may be implemented.

Referring now to the drawings, and first to FIG. 1, an example of a network in which embodiments described herein may be implemented is shown. The embodiments described herein operate in the context of a data communication network including multiple network devices. Some of the devices in the network may be switches (e.g., access switch, aggregation switch), bridges, routers, gateways, or other network devices. The network device may include, for example, a master central processing unit (CPU), memory, interfaces, and a bus. In one embodiment, the network device is implemented on a general purpose machine as described below with respect to FIG. 5.

The network shown in FIG. 1 includes provider edge (PE) nodes PE1 (12) and PE2 (14) connected to access ring (e.g., Ethernet ring) 16. The access ring 16 includes access nodes 18, 20, 22, 24, 26, which may each comprise a switch or bridge. The access ring 16 is in communication with a core network (e.g., MultiProtocol Label Switching (MPLS) network) 28 via the PE nodes 12, 14. The core network 28 may include any number of provider edge nodes 15 connected to other networks. The provider edge nodes 12, 14, 15 are connected via links 17 passing through internal nodes (not shown). The PE nodes may provide any type of L2VPN service (e.g., VPWS or VPLS) or Layer 3 service. The PE nodes 12, 14 provide multi-homed (e.g., dual-homed) connectivity to either individual devices (e.g., CE (customer edge) device) or digital subscriber line access multiplexer (DSLAM) in the access network 16. One of the PE nodes 12, 14 provides an active point-of-access (POA) to the access ring 16 while the other provider edge node provides a backup (standby) point-of-access. The PE nodes 12, 14 form a redundancy group which falls under a single administration (e.g., service provider) and employs a common redundancy mechanism towards the access ring 16.

The embodiments described herein operate at one or more of the provider edge nodes 12, 14 to provide protection against failure, including for example, split ring failure (i.e., failure of any link or node in the access ring 16 including an uplink port failure at an access node 18, 20, 22, 24, 26), PE node 12, 14 downlink port failure, PE node failure, or PE node isolation from the core network 28 (i.e., failure of all of a PE node's core facing interfaces).

The PE nodes 12, 14 are configured to communicate with one another via a logical or physical link 30. In one embodiment, a state synchronization protocol, such as Inter-Chassis Communication Protocol (ICCP) is run between the two PE nodes. ICCP is described in Martini et al., IETF Internet Draft entitled "Inter-Chassis Communication Protocol for L2VPN PE Redundancy", dated Feb. 17, 2009. ICCP forms a redundancy group for the purpose of synchronizing data among the systems. It is to be understood that ICCP is only one example and that other protocols may be used to communicate information between the PE nodes 12, 14.

The PE nodes may also be configured to utilize pseudo multi-chassis link aggregation control protocol (LACP) described in patent application Ser. No. 12/344,099, entitled "Provider Edge-Controlled Redundancy Using Pseudo Link Aggregation Control Protocol", filed Dec. 24, 2008, which is incorporated herein by reference in its entirety.

In one embodiment, the PE nodes 12, 14 are configured to receive continuity check messages (CCM) using connectivity fault management (CFM) described in IEEE standard 802.1ag-2008 and ITU-T-Y.1731. As described below, CFM state is used to trigger protection following a failure. Each node in the ring 16 is configured with a CFM maintenance end point (MEP), which is a demarcation point on an interface (port) that participates in CFM within a maintenance domain. The MEPs may be Up MEPs or Down MEPs. The Up MEP is inward facing (communicates via the backplane of the bridge). It sends and receives CFM frames at its level through a bridge relay function rather than a wire connected to the port on which the MEP is configured. The Down MEP is outward facing (communicates through the wire). The Down MEP sends and receives CFM frames at its level via the wire connected to the port where the MEP is configured. It is to be understood that continuity check messages other than CCMs using CFM protocol may be used without departing from the scope of the invention.

Referring again to FIG. 1, a single CFM maintenance domain, which spans the access nodes 18, 20, 22, 24, 26 and the PE nodes 12, 14, is defined. Up MEPs are configured on user-to-network interfaces (UNIs) 32 of the access nodes 18, 20, 22, 24, 26 in the ring 16. If there are multiple UNIs per access node for a given Ethernet Virtual Connection (EVC), it is sufficient to have an MEP configured on just one of the UNIs.

The access nodes 18, 20, 22, 24, 26 have symmetric VLAN configuration on their network-to-network interfaces (NNIs) 34. The access nodes are thus configured to pass all VLANs on their ring links (i.e., NNIs) and VLANs can be forwarded in either direction on the ring 16. The NNIs 34 may be CFM transparent ports or equipped with MIPs (maintenance intermediate points).

The PE nodes 12, 14 are configured with Down MEPs on their ring ports 36 that connect to the access ring 16 and may be manually configured to allow or block VLANs on these ports. For example, if a VLAN is configured to be allowed on PE1, it is blocked on PE2. This allows PE2 to serve as a backup for PE1 for that particular VLAN. Since different VLANs may be active on different PE nodes 12, 14, active/active PE redundancy is provided. This allows load-balancing over the ring 16.

Figure 2:
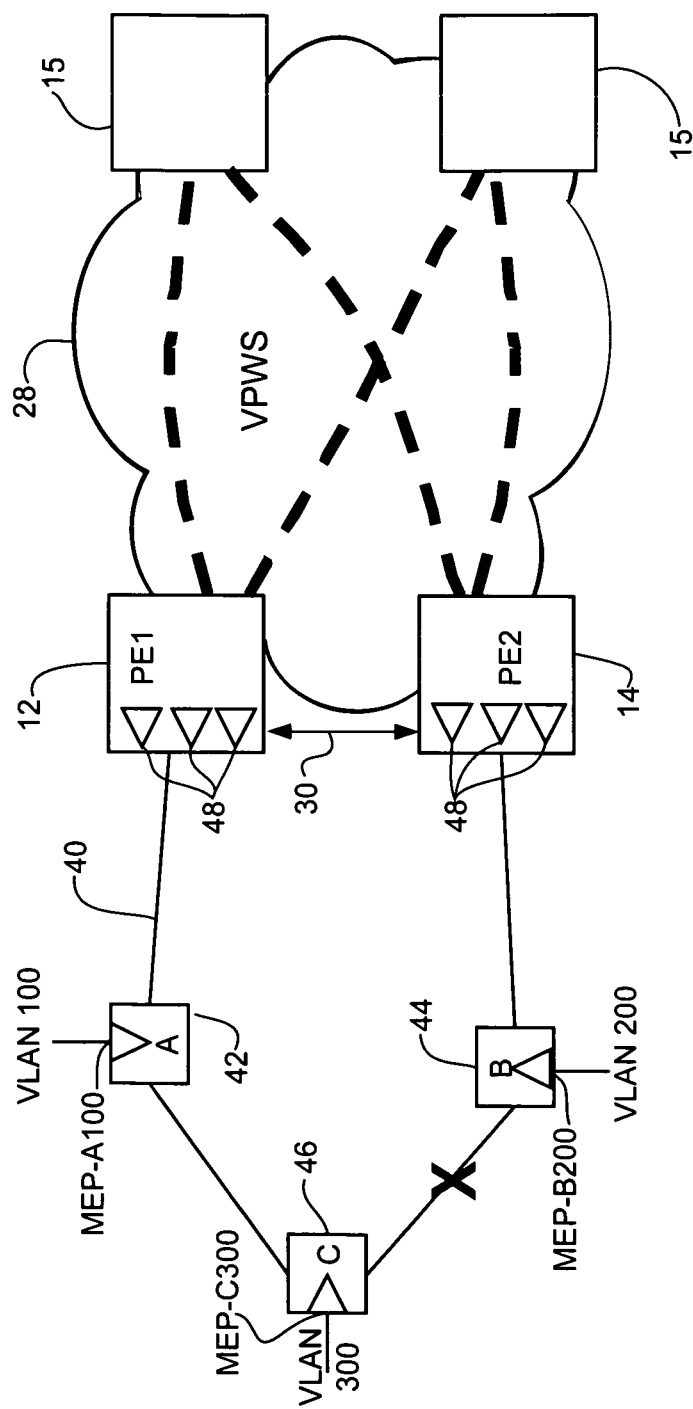
FIG. 2 illustrates protection against a split ring failure for VPWS.

Referring now to FIG. 2, an example illustrates protection against a split ring failure for VPWS. The core network 28 is connected to ring 40 via provider edge nodes PE1 (12) and PE2 (14). The access ring 40 includes access nodes (e.g., switches) 42 (node A), 44 (node B), and 46 (node C). The system is configured with three VPWS services corresponding to VLAN 100, VLAN 200, and VLAN 300 which have sites connected to access nodes 42, 44, and 46, respectively. Each of the access nodes has an Up MEP for its VLAN, configured on the relevant UNI. Node 42 is configured with MEP-A100, node 44 is configured with MEP-B200, and node 46 is configured with MEP-C300. PE1 and PE2 each have three Down MEPs 48 (one per VLAN) on the port connecting to the access ring 40. VLAN 100 is initially active on PE1 and VLAN 200 and VLAN 300 are initially active on PE2. This may be explicitly configured on the PE nodes, for example.

At steady state, with no faults in the network, traffic over VLAN 100 coming from the access switch 42 flows clockwise over the ring 40 to reach the core network 28 via PE1, and traffic over VLAN 200 and VLAN 300 flows counter-clockwise over the ring 40 to reach the core network 28 via PE2. Both PE nodes 12, 14 receive CCMs from the access switches 42, 44, 46. PE1 and PE2 thus receive CCMs from MEP-A100 (MEP on switch 42 for VLAN 100), MEP-B200 (MEP on switch 44 for VLAN 200), and MEP-C300 (MEP on switch 46 for VLAN 300).

As illustrated in FIG. 2, a ring failure occurs causing the link between access nodes 44 and 46 to go down (see X in FIG. 2). PE1 no longer receives CCMs from MEP-B200. PE1 continues to receive CCMs from MEP-A100 and MEP-C300. PE2 no longer receives CCMs from MEP-A110 or MEP-C300. PE2 only receives CCMs from MEP-B200. PE1 and PE2 synchronize state over link 30 (e.g., utilizing ICCP) and determine that the CFM alarms indicate a split ring condition. The condition is identified as follows: access nodes 42 and 46 continue to have connectivity to PE1; access node 44 lost connectivity to PE1 but still maintains connectivity to PE2. The PE nodes 12, 14 use this information to trigger a failover of VLAN 300 from PE2 to PE1. PE2 instructs PE1 (e.g., via ICCP) to activate VLAN 300 on PE1 node's ring-facing port. PE1 sends a MAC flush notification to the ring 40.

The MAC flush notification may be based on Multiple VLAN Registration Protocol (MVRP) (IEEE 802.1ak) or may rely on the continuity check messages. In one example, the PE node may assert an RDI (remote defect indication) bit in the CCMs it transmits for VLAN 300 over the ring. The access switch 46 uses this RDI bit as a trigger to flush its MAC address tables. If CFM is used for MAC flushing notification, the access ring does not need to run any protocol other than CFM, which simplifies network operation. It is to be understood that these are only examples and that other processes may be used to transmit a flush notification.

Figure 3:
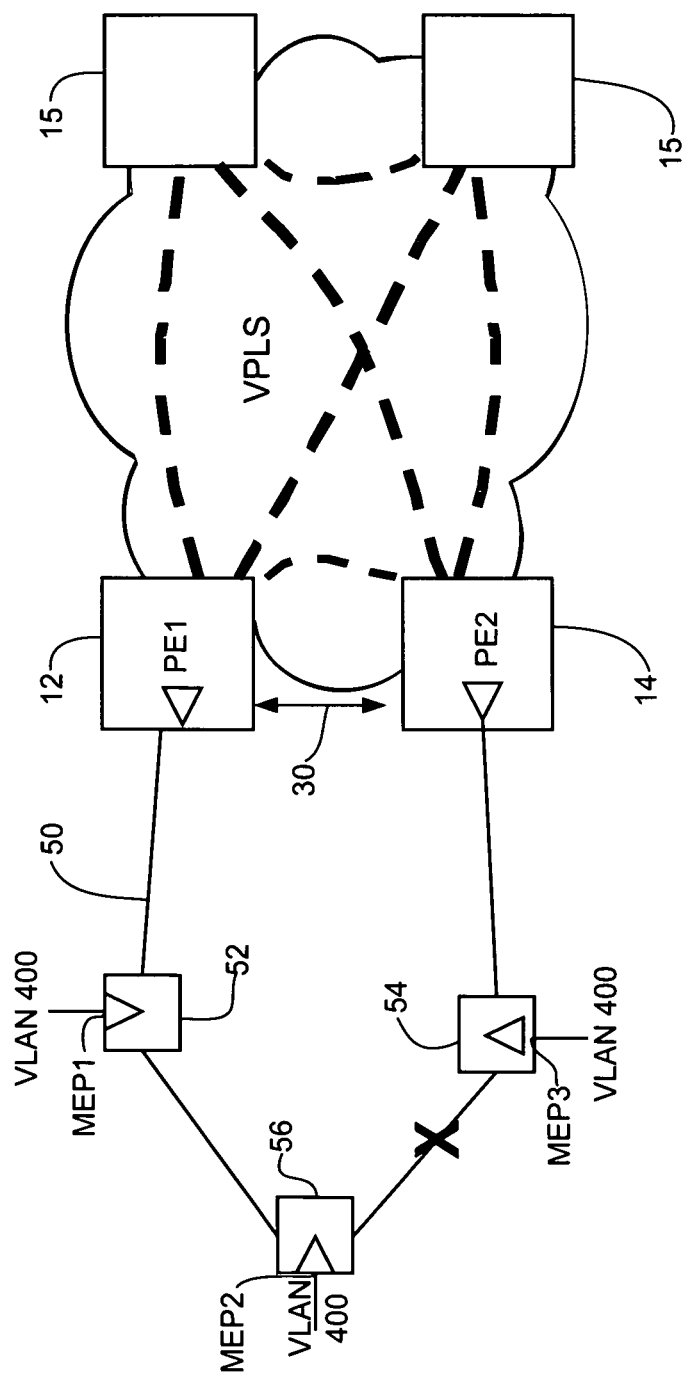
FIG. 3 illustrates protection against a split ring failure for VPLS.

FIG. 3 illustrates an example of protection against split ring for VPLS. The two provider edge nodes 12, 14 are connected to access ring 50. VLAN 400 is active on each access node 52, 54, 56 on ring 50. Each access node is configured with an Up MEP (MEP1, MEP2, MEP3). VLAN 400 is initially active on PE1. A failure occurs at the link connecting access node 54 to access node 56 (see X in FIG. 3). VLAN 400 MEP on PE1 detects from the loss of continuity check messages that MEP3 is down. PE1 maintains VLAN 400 as active and instructs PE2 to activate VLAN 400. Thus, both PE nodes 12, 14 are active for the VLAN after the ring split. PE2 sends a MAC flush notification to the ring 50.

Figure 4:
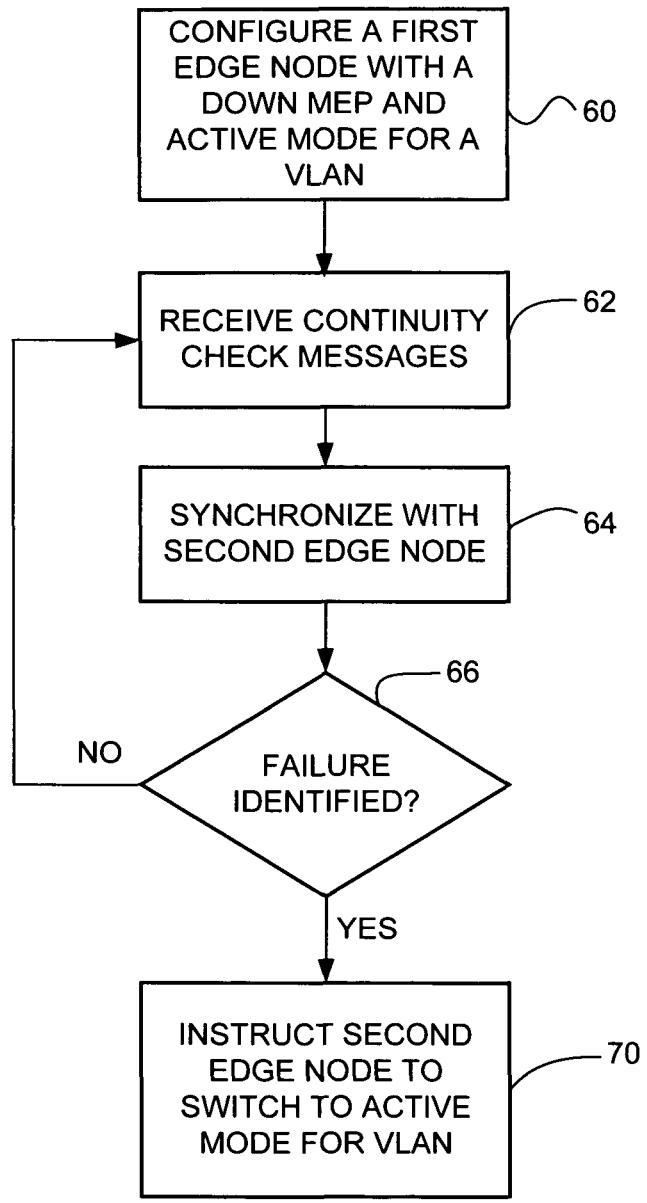
FIG. 4 is a flowchart illustrating a process for access ring protection.

FIG. 4 is a flowchart illustrating a process for access ring protection at a first edge node connected to an access ring (e.g., PE1 in FIG. 1). At step 60, the first edge node is assigned a Down MEP for an associated VLAN. The first edge node is initially in active mode for the VLAN. A second edge node (e.g., PE2 in FIG. 1) is also connected to the access ring, configured with a Down MEP and initially in backup mode. At step 62 the first edge node receives and processes continuity check messages from access nodes on the access ring. At step 64 the first node synchronizes state with the second edge node. The synchronization may be initiated by one of the edge nodes based on a loss of continuity check messages or may be performed at periodic intervals, for example. If a failure is not identified during the synchronization, the node continues to receive continuity check messages at step 62. If a failure is identified for the VLAN, the first node communicates to the second node to initiate switching of the second node from the backup mode to the active mode for the VLAN (steps 66 and 70). If the service associated with said VLAN is VPWS, the first node switches to backup mode for the VLAN. If the service associated with the VLAN is VPLS, the first node remains in active mode. As described above, the second edge node sends out a MAC flush notification to the ring and possibly to the core network.

It is to be understood that the process described above is only one example and that steps may be added or removed or the steps may be reordered or combined, without departing from the scope of the invention.

Figure 5:
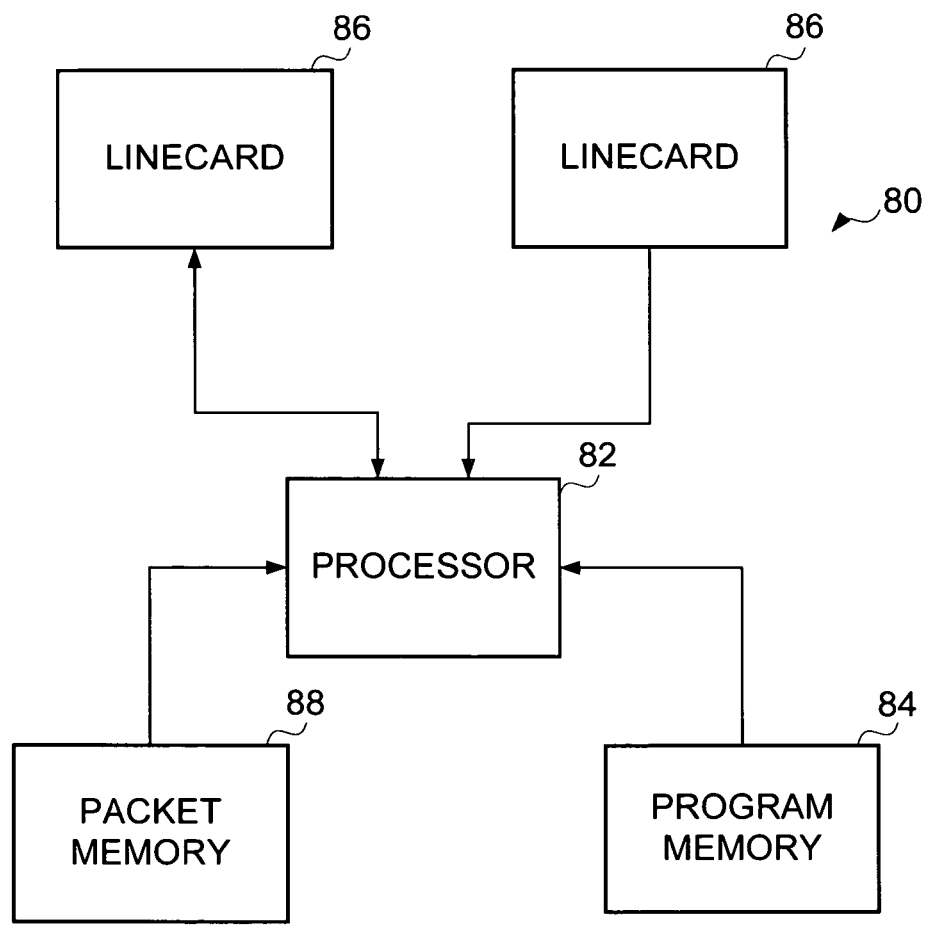
FIG. 5 depicts an example of a network device useful in implementing embodiments described herein.

FIG. 5 depicts a network device 80 that may be used to implement embodiments described herein. Network device 80 is configured to implement all of the network protocols and extensions thereof described above. In one embodiment, network device 80 is a programmable machine that may be implemented in hardware, software, or any combination thereof. Logic may be encoded in one or more tangible media for execution by a processor. For example, processor 82 may execute codes stored in a program memory 84. Program memory 84 is one example of a computer-readable medium. Program memory 84 can be a volatile memory. Another form of computer-readable medium storing the same codes is a type of non-volatile storage such as floppy disks, CD-ROMs, DVD-ROMs, hard disks, flash memory, etc.

Network device 80 interfaces with physical media via a plurality of linecards 86. Linecards 86 may incorporate Ethernet interfaces, DSL interfaces, Gigabit Ethernet interfaces, 10-Gigabit Ethernet interfaces, SONET interfaces, etc. As packets are received, processed, and forwarded by network device 80, they may be stored in a packet memory 88. To implement functionality according to the system, linecards 86 may incorporate processing and memory resources similar to those discussed above in connection with the network device as a whole. It is to be understood that the network device 80 shown in FIG. 5 and described above is only one example and that different configurations of network devices may be used.

As can be observed from the foregoing, embodiments described herein provide numerous advantages. For example, since the provider edge nodes can be configured with active/active redundancy, the PE nodes can perform load sharing. Furthermore, the protection mechanism provides good scalability since in the typical case the number of CCMs per transmission interval and the number of MEPs are based only on the number of VLANs in the ring (rather than on the order of the number of nodes multiplied by the number of VLANs).

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
    configuring a port at a first node with one or more down maintenance end points assigned for each of one or more virtual local area networks, the port connecting said first node to an access ring, said first node located at an edge of a core network and operating in an active mode for one or more of the virtual local area networks, said first node in communication with a second node located at said edge of the core network and connected to the access ring, each of said first and second nodes configured for Virtual Private Wire Service (VPWS) or Virtual Private Local Area Network Service (VPLS);
    receiving and processing at a processor at said first node, continuity check messages from access nodes on the access ring;
    synchronizing said first node with said second node;
    identifying a failure;
    communicating from said first node to said second node to initiate switching of said second node from a backup mode to said active mode for one or more of the virtual local area networks; and
    said first node switching to said backup mode for the virtual local area network if a service associated with the virtual local area network is VPWS and remaining in said active mode if the service associated with the virtual local area network is VPLS;
    wherein said synchronizing and communicating is performed directly between said first node and said second node without utilizing said access ring, and said down maintenance end point participates in connectivity fault management (CFM) within a maintenance domain and communicates CFM frames via a wire connected to the port.

2. The method of claim 1 wherein receiving continuity check messages comprises utilizing connectivity fault management protocol.

3. The method of claim 1 wherein synchronizing and communicating from said first node to said second node comprises utilizing an inter-chassis communication protocol.

4. The method of claim 1 further comprising receiving traffic from one of the access nodes on the access ring, wherein the access node is configured with an up maintenance end point on a user-to-network interface of the access node, wherein said up maintenance end point communicates CFM frames through a bridge relay function.

5. The method of claim 1 wherein said failure is an access node port failure, a link failure in the access ring, a failure in said first or second node, or a failure resulting in isolation of one of said first and second nodes from the core network.

6. The method of claim 1 wherein said one or more virtual local area networks comprise a plurality of virtual local area networks and assigning a maintenance end point comprises assigning a maintenance end point for each of said plurality of virtual local area networks, and wherein communicating comprises communicating to initiate switching of said second node from said backup mode to said active mode for one or more of said virtual local area networks.

7. The method of claim 6 wherein receiving continuity check messages comprises receiving a continuity check message from each of the access nodes in the access ring prior to said failure.

8. The method of claim 1 further comprising transmitting a MAC table flush notification to the access nodes following said failure.

9. The method of claim 1 wherein said first node is configured for virtual private wire service and further comprising switching operation of said first node to said backup mode for the virtual local area network upon identification of said failure.

10. The method of claim 1 wherein said first node is configured for virtual private local area network service and wherein said first node remains in said active mode following said failure.

11. The method of claim 1 wherein receiving continuity check messages further comprises sensing a loss of continuity check messages from one or more of the access nodes on the access ring and identifying said failure upon synchronizing said first node with said second node.

12. An apparatus located at an edge of a core network and connected to an access ring, the apparatus comprising:
   a processor for configuring a port with a down maintenance end point for each of one or more virtual local area networks, the port connecting the apparatus to the access ring, communicating with an edge node located at said edge of the core network and connected to the access ring, processing continuity check messages received from access nodes on the access ring, synchronizing state with the edge node, and communicating to the edge node to initiate switching of the edge node from a backup mode to an active mode for the virtual local area network upon identification of a failure; and
   memory for storing said state of the apparatus based on said received continuity check messages;
   wherein said synchronizing and communicating is performed directly between the apparatus and the edge node without utilizing said access ring, and said down maintenance end point participates in connectivity fault management (CFM) within a maintenance domain and communicates CFM frames via a wire connected to the port; and
   wherein the apparatus is configured for Virtual Private Wire Service (VPWS) or Virtual Private Local Area Network Service (VPLS), the processor configured to switch to said backup mode for the virtual local area network if a service associated with the virtual local area network is VPWS and remain in said active mode if the service associated with the virtual local area network is VPLS.

13. The apparatus of claim 12 wherein each of the access nodes is configured with an up maintenance end point on a user-to-network interface of the access node, wherein said up maintenance end point communicates CFM frames through a bridge relay function.

14. The apparatus of claim 12 wherein said failure is an access node port failure, a link failure in the access ring, a failure in the apparatus or the edge node, or a failure resulting in isolation of the apparatus or the edge node from the core network.

15. The apparatus of claim 12 wherein the apparatus is for virtual private wire service and the processor switches operation of the apparatus to said backup mode for the virtual local area network upon identification of said failure.

16. The apparatus of claim 12 wherein the apparatus is for virtual private local area network service and the processor maintains the apparatus in said active mode following said failure.

17. An apparatus comprising:
   a port at a first node configured with a down maintenance end point for each of one or more virtual local area networks, the port connecting said first node to an access ring, said first node located at an edge of a core network and operating in an active mode for one or more of the virtual local area networks, said first node in communication with a second node located at said edge of the core network and connected to the access ring; and
   a processor at said first node for processing continuity check messages from access nodes on the access ring, synchronizing said first node with said second node, identifying a failure, and communicating from said first node to said second node to initiate switching of said second node from a backup mode to said active mode for the virtual local area networks;
   wherein said synchronizing and communicating is performed directly between said first node and said second node without utilizing said access ring, and said down maintenance end point participates in connectivity fault management (CFM) within a maintenance domain and communicates CFM frames via a wire connected to the port; and
   wherein the apparatus is configured for Virtual Private Wire Service (VPWS) or Virtual Private Local Area Network Service (VPLS), the processor configured to switch to said backup mode for the virtual local area network if a service associated with the virtual local area network is VPWS and remain in said active mode if the service associated with the virtual local area network is VPLS.

18. The apparatus of claim 17 wherein said down maintenance end point comprises said down maintenance end point on a ring interface of said first node and wherein each of the access nodes is configured with an up maintenance end point on a user-to-network interface of the access node, wherein said up maintenance end point communicates CFM frames through a bridge relay function.

* * * * *